UNITED STATES PATENT OFFICE.

CARLETON ELLIS, OF LARCHMONT, NEW YORK, ASSIGNOR TO ELLIS-FOSTER COMPANY, A CORPORATION OF NEW JERSEY.

FEEDING-STUFF.

1,018,415.     Specification of Letters Patent.     Patented Feb. 27, 1912.

No Drawing.     Application filed December 10, 1908. Serial No. 466,782.

*To all whom it may concern:*

Be it known that I, CARLETON ELLIS, a citizen of the United States, residing at Larchmont, in the county of Westchester and State of New York, have invented certain new and useful Improvements in Feeding-Stuffs, of which the following is a specification.

This invention relates to an improved type of dog biscuit having particularly for its object the production of a malted composition containing a portion of the starchy material converted by diastatic action into a product of a more digestible, nutritious and assimilable character. The dog being a carnivorous animal is not well adapted to digest starch.

My invention also involves the utilization of the waste milk of slaughter houses, etc., as well as other material of little value which must daily be disposed of in abattoirs and similar establishments.

My invention further has to do with the production of a dog biscuit in the shape of a bone or elongated flattened dumb-bell, which I have found to be an especially attractive form for dogs; it being common observation that dogs generally refuse to eat dog biscuit of the ordinary shapes until forced to do so by being refused other food for a period of time. A dog acquires a taste for ordinary dog biscuit only after being fed upon it for extended periods and the first attempt to teach him to feed upon such material, is beset with great difficulties. At first, it is generally necessary to feed such biscuits in the form of fragments saturated with fresh meats, soup extracts, etc.

By forming my improved composition into shapes resembling that of a bone, the dog to whom the same is fed, does not object to the food but seizes upon it with alacrity. Furthermore, a dog biscuit made in the shape of a bone is not merely of such a form as to be specially attractive to dogs, because of its resemblance to an article of which all dogs are fond, but because of its shape is of such a nature, that the dog biscuit can be readily grasped by a dog. As it lies upon the ground there is an elevated portion under which the dog can insert his lower jaw and readily grasp the cake, whereas with a square cake, the shape in which the dog biscuit have heretofore been made, the article lies flat on the floor and there is no way for a dog to grasp it without opening his mouth sufficiently wide to grasp the cake over the entire width of the same, a matter of great difficulty with any except the largest dogs. With a dumb-bell shaped cake, the knobbed ends rest upon the ground and the middle or shank portion is raised somewhat thereabove. It is very advantageous to form dog biscuits of compositions such as those here described, into a bone-shaped body having a portion readily graspable by the dog.

It being one object of this invention to act upon the starch and other similar components of the composition with diastase to form maltose, dextrinized bodies, etc., I preferably employ for this purpose malt or malt extract carrying as large an amount of diastatic ferments as is possible to secure. Such diastatic bodies have a pronounced action on starchy materials at certain temperatures and in all probability exert some action on the proteid matters present.

In illustration of the composition, I set forth the following formula:—

| | |
|---|---|
| Waste milk | 1 gallon. |
| Diastatic malt extract 30 Baumé | 3 lbs. |
| Meat | 4 " |
| Flour | 40 " |
| Bone meal | 2 " |
| Corn meal | 2 " |
| Molasses | 4 " |

Water sufficient to make a thick dough.

In mixing these components, I preferably first cook the meat, such as fresh beef and the like in water and grind or comminute into small particles. This meat and liquor is mixed with the flour, bone meal and corn meal. The malt is added to the milk which preferably should be at a temperature of about 40° C. at the time of such addition. The milk is introduced into the flour and meal, the salt and molasses added, and finally sufficient water to produce dough of suitable consistency. This mixture is kneaded in a pan preferably heated by a steam jacket so that the temperature may be raised to 60° C. or thereabout, so as to cause diastatic action to take place on the elements of the flour, milk, meat, etc., susceptible to its action. After being thoroughly kneaded and converted, the dough is rolled out into sheets and cut in the form of cakes resembling to some extent the shape or outline of a bone. These cakes are then baked to the requisite degree and are then ready for shipment. The flour which I employ is preferably highly glutinous although ordinary flour may be employed. As stated, the dog is not well adapted to digest starch while able to digest proteids, and it is therefore better to use flour having a high percentage of gluten although the malting of the flour as in the present method makes the starch unobjectionable. A mixture of high gluten flour with ordinary white flour in about equal parts also works satisfactorily. The corn meal should be carefully bolted so as to be free from coarse particles or bran. The bone meal should also be free from very coarse particles. In lieu of molasses, glucose or similar saccharine matter may be employed. When desired, the milk may be reduced in amount or even entirely omitted, as also the molasses or sugary matter and salt. Chopped dried vegetables may also be introduced when desired in place of bone meal, ground phosphate material and the like may be used. Oatmeal and rye flour or ground beans and peas may be substituted for the corn meal.

Dried and ground sugar beet is a most excellent component of the present composition as it furnishes saccharine matter and vegetable fiber in a readily assimilable form. An illustrative formula comprising this material is as follows:—

| | |
|---|---|
| Flour | 42 lbs. |
| Malt extract | 2 " |
| Milk | ½ gal. |
| Meat | 4 lbs. |
| Sugar beet | 4 " |

Water to make a thick dough.

This composition is treated substantially as hereinbefore specified.

Another composition comprises:—

| | |
|---|---|
| Flour | 35 lbs. |
| Bean meal | 3 " |
| Beef meal | 5 " |
| Bone meal | 2 " |
| Malt extract, diastatic | 3½ " |
| Turnip, dried and ground | 1½ " |

This mixture is made into a dough with water and is subjected to diastatic conversion at a temperature of 50° to 60° C. allowing sufficient time for the diastase enzyms to act so as to convert a substantial portion of starch and proteid bodies, susceptible to its splitting action, into more digestible and nutritious materials.

From the foregoing, it will be evident that the formula may be varied to a considerable degree in proportions and ingredients without departing from the scope of my invention and I do not wish to limit myself to the exact details above set forth.

What I claim is:—

1. A bone-shaped dog biscuit comprising malted flour, meat and milk material and saccharine matter.

2. A bone-shaped dog biscuit comprising flour, bone meal, meat, corn meal, milk and malt.

3. A bone-shaped dog biscuit consisting of flour, bone meal, meat, corn meal, milk, diastatic malt and molasses.

4. As a new article of manufacture, a dog biscuit substantially in the shape of a bone comprising as ingredients the following, in substantially the following proportions: Gluten flour—forty pounds; bone meal, two pounds; comminuted meat, four pounds; corn meal, two pounds; milk, one gallon, diastatic malt, three pounds; molasses, four pounds; salt, seven ounces and incorporated water.

In testimony whereof I have affixed my signature in presence of two witnesses.

CARLETON ELLIS.

Witnesses:
 NATHANIEL L. FOSTER,
 JOHN H. DERBY, Jr.